(12) United States Patent
Kim (10) Patent No.: US 8,580,424 B2
(45) Date of Patent: Nov. 12, 2013

(54) RECHARGEABLE BATTERY

(75) Inventor: Young-Teag Kim, Cheonan-si (KR)

(73) Assignee: Samsung SDI Co., Ltd., Suwon (KR)

( * ) Notice: Subject to any disclaimer, the term of this patent is extended or adjusted under 35 U.S.C. 154(b) by 1561 days.

(21) Appl. No.: 10/847,365

(22) Filed: May 18, 2004

(65) Prior Publication Data

US 2004/0241536 A1 Dec. 2, 2004

(30) Foreign Application Priority Data

May 26, 2003 (KR) .................. 10-2003-0033339

(51) Int. Cl.
*H01M 2/00* (2006.01)
*H01M 2/02* (2006.01)
*H01M 2/12* (2006.01)
*H01M 2/36* (2006.01)

(52) U.S. Cl.
USPC ............. 429/163; 429/164; 429/53; 429/56; 429/72; 429/82

(58) Field of Classification Search
USPC .................. 429/122, 53, 72, 82, 162, 175
See application file for complete search history.

(56) References Cited

U.S. PATENT DOCUMENTS

| | | | | |
|---|---|---|---|---|
| 5,462,820 A | * | 10/1995 | Tanaka | 429/174 |
| 5,567,539 A | * | 10/1996 | Takahashi et al. | 429/57 |
| 5,691,073 A | * | 11/1997 | Vu et al. | 429/7 |
| 5,998,051 A | * | 12/1999 | Poirier et al. | 429/7 |
| 6,555,263 B1 | * | 4/2003 | Kim et al. | 429/61 |

FOREIGN PATENT DOCUMENTS

| | | |
|---|---|---|
| CN | 1290972 | 4/2001 |
| CN | 1306315 | 8/2001 |
| CN | 1290973 | 4/2004 |
| JP | 02102330 | 4/1990 |
| JP | 10275612 | 10/1998 |
| JP | 10-294093 | 11/1998 |
| JP | 2001229913 | 8/2001 |
| KR | 2001-0081549 | 8/2001 |

OTHER PUBLICATIONS

Webters New World Dictionary, The world Publishing Company, College Edition 1966, p. 1400.*

* cited by examiner

*Primary Examiner* — Helen O Conley
(74) *Attorney, Agent, or Firm* — H.C. Park & Associates, PLC (57) ABSTRACT

A rechargeable battery includes a can having an open portion in an upper region and accommodates a power generating unit. A flexible plate is installed in the opening portion, the flexible plate being connected to an electrode of the power generating unit and flexing when the internal pressure of the rechargeable battery rises above an allowable range. A terminal cap is arranged on the flexible plate, electrically connected to the flexible plate, and has an insulating portion on a bottom surface. An insulating substrate is arranged between the flexible plate and the terminal cap and has a rupture portion that is broken when the flexible plate flexes beyond an allowable range. Upon breaking the broken ends of the insulating substrate directly contact the insulating portion of the terminal cap so that the insulating substrate is electrically disconnected from the terminal cap. Additionally, a gasket is installed between edges of the flexible plate, the insulating substrate, and the terminal cap plate and an inner wall of the opening portion to insulate the flexible plate, the insulating substrate, and the terminal cap from the can.

19 Claims, 5 Drawing Sheets

RECHARGEABLE BATTERY

This application claims the priority of Korean Patent Application No.2003-33339, filed on May 26, 2003, in the Korean Intellectual Property Office, which is incorporated by reference for all purposes as if fully set forth herein.

BACKGROUND OF THE INVENTION

1. Field of the Invention

The present invention relates to a rechargeable battery, and more particularly to a rechargeable battery having a current cutoff device that operates to ensure safety when operational malfunctions increase the internal pressure of the battery.

2. Discussion of the Related Art

Representative examples of rechargeable batteries that can be manufactured in a small size with large capacity, include, for example, nickel-hydrogen (Ni—H) batteries, lithium batteries, lithium ion batteries, polymer lithium (PLi) batteries, and the like. These rechargeable batteries may be classified based on their appearance. For example, they may be classified as cylindrical batteries, rectangular batteries, pouch type batteries, and so on.

Also, the secondary batteries may include a jelly-roll electrode element. The jelly-roll electrode is a power generator element manufactured by rolling together a stack of a positive electrodes, a separator, and a negative electrodes. The positive and negative electrodes may be manufactured by coating substrates with corresponding active materials, followed by drying, roll pressing and cutting the coated substrates. The cylindrical battery is manufactured by placing the power generator element into a cylindrical can, injecting electrolyte, and sealing the can. Additionally, the power generator element is compressed into a rectangular shape before placing it in a rectangular can.

In the related art, cylindrical rechargeable batteries include a current cutoff device that cuts off a flow of current with a shaped plate. That is, the shaped plate breaks when the internal pressure of the battery rises above an allowable level due to overcharging or operational failures.

For example, U.S. Pat. No. 5,418,082 discloses a sealed battery that includes a current cutoff device, which is hereby incorporated by reference. A safety valve bends when the internal pressure of the battery rises. A gasket is included near an opening of the battery. The safety valve includes a downward protrusion that is welded to a metallic thin plate. An electrode tab of the power generator element is attached to the safety valve by welding. When the internal pressure of the battery rises and the downward protrusion of the safety valve flexes upward, the safety valve is separated from the metal thin plate, thereby cutting off the flow of current.

In these sealed batteries with current cutoff devices, the flow of current in a sealed battery may or may not be timely cut off. This depends on the state of the welded connections between the protrusion of the safety valve and the thin metal plate. Additionally, welded portions of the safety valve and the thin metallic plate may react with an electrolyte, oxidize, and become more likely to separate from one another via small external impacts after a long period of use. It may have nothing to do with the internal pressure of the battery as there are a number of factors to consider when welding the safety valve and the metal thin plate. This makes it difficult to ensure the operational reliability of the current cut-off device. Therefore, the reliability and safety of the battery is not guaranteed.

To improve the limitations of the above described current cut-off device used in conventional sealed batteries, sealed batteries with a more reliable current cut-off device are disclosed in Korean Laid-Open Patent Application Nos. 2001-81549 and 2001-81550 assigned to the same assignee as the present invention, which are hereby incorporated by reference. A sealed battery disclosed in Korean Laid-Open Patent Application No. 2001-81549 is illustrated in FIG. 1.

Figure 1:
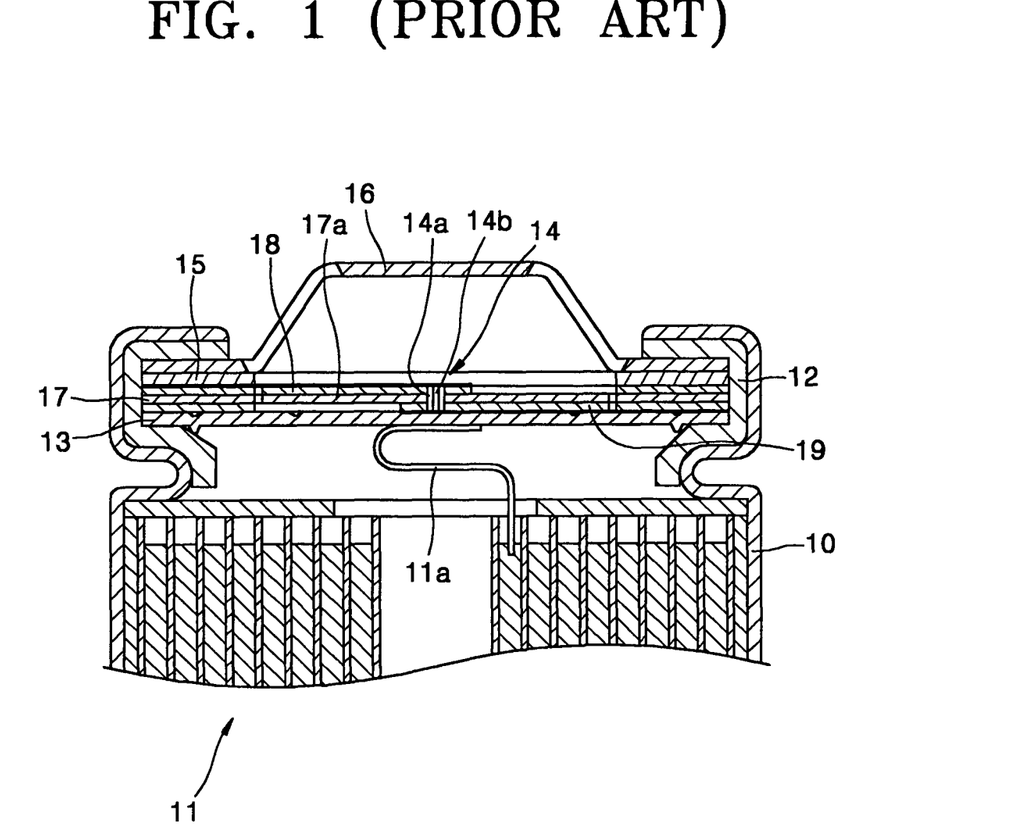
FIG. 1 shows a sectional view of a rechargeable battery according to the related art.

As shown in FIG. 1, the sealed battery includes a power generator element 11 that is comprised of a positive electrode, a negative electrode, and a separator that are sealed in a can 10. The sealed battery also includes a flexible plate 13 capable of flexing upward in response to the internal pressure of the battery. The flexible plate is connected to an opening of the can 10 by a gasket 12 and to an electrode tab 11a of the power generator element 11. A current cutoff device 14, a positive temperature coefficient (PTC) element 15, and a terminal cap 16 are sequentially disposed on the top of the flexible plate 13.

The current cutoff device 14 includes an insulating substrate 17 with a traverse 17a in a portion corresponding to a deformable center portion of the flexible plate 13. Additionally, upper conductive thin film 18 and lower conductive thin film 19 are formed on and underneath the insulating substrate 17, respectively; a connector 14a connects the upper conductive thin film 18 and lower conductive thin film 19; and a rupture portion 14b is formed in the traverse 17a of the insulting substrate 17. The upper conductive thin film 18 and the lower conductive thin film 19 are displaced from the center of the insulating substrate 17 in opposite directions, having an orientation where one end of the upper conductive thin film 18 corresponds to the terminal cap 16 and one end of the lower conductive thin film 19 overlaps the upper conductive thin film 18.

Figure 2:
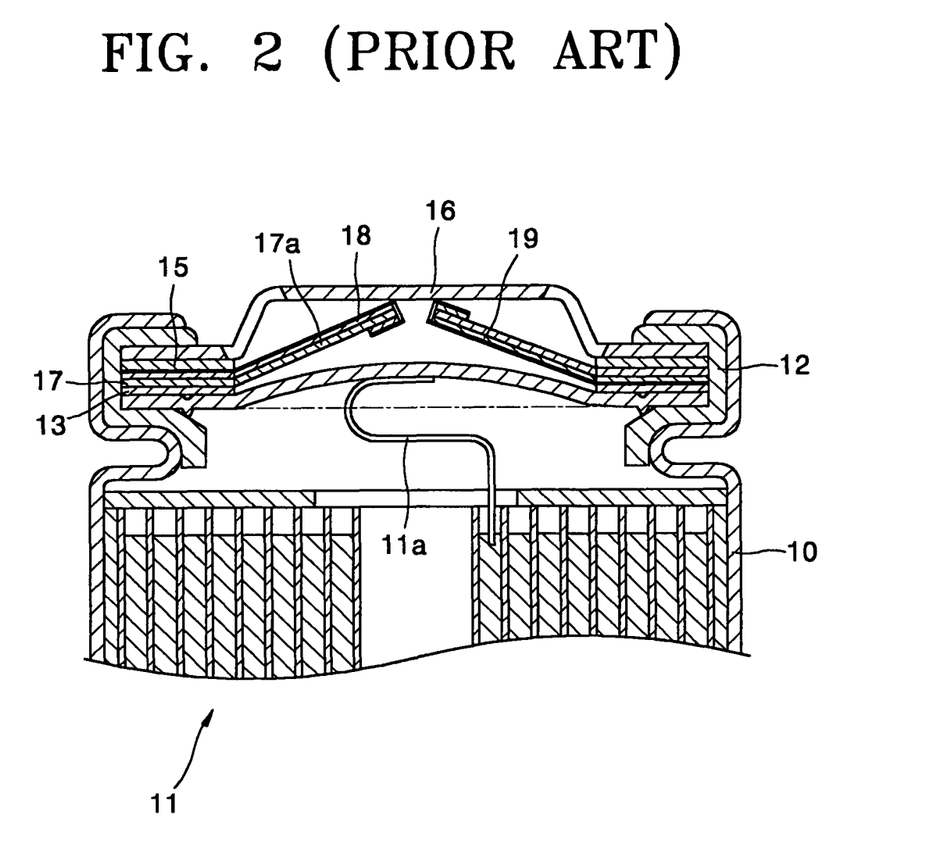
FIG. 2 shows an exploded perspective view of a cap assembly of FIG. 1.

In the current cutoff device 14 having the above structure, the flexible plate 13 of the current cutoff device 14 bends upward, as illustrated in FIG. 2. That is, when the internal pressure of the battery rises above an allowable range, the rupture portion 14b formed in the traverse 17a of the insulating substrate 17 ruptures, thereby cutting off the flow of current in the battery. The flow of current can be cut off with improved reliability as the physical deformation of the flexible plate 13 causes the rupture portion 14b to break.

As illustrated in FIG. 2, when the rupture portion 14b ruptures the insulating substrate 17 and is broken into parts, the broken ends of the parts rise toward the terminal cap 16. Accordingly, the insulating substrate 17 is short-circuited from the terminal cap 16 by the exposed upper and lower conductive thin films 18 and 19. As such, the flow of current in the battery cannot be cut off completely with the current cutoff device 14 having the above structure, thereby failing to ensure the safety of the battery. To prevent this problem, the upper and lower conductive thin films 18 and 19 are coated with insulating films. However, the insulating films at the broken ends of the upper and lower conductive thin films 18 and 19 may be ripped off, causing the same problem as above. Furthermore, the insulating films are likely to be damaged when assembling the battery.

SUMMARY OF INVENTION

Accordingly, the present invention is directed to a rechargeable battery that substantially obviates one or more of the problems due to limitations and disadvantages of the related art.

The present invention discloses a battery with an effective current cutoff device that reliably operates in response to the increases in internal pressure of the battery.

The present invention also ensures safe operation of the battery.

Additional aspects of the present invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a rechargeable battery comprises a can having an open portion in an upper region. A power generating unit is arranged in a portion of the can. A flexible plate is installed in the opening portion, and is connected to an electrode of the power generating unit and flexes when the internal pressure of the rechargeable battery rises above an allowable range. A terminal cap is arranged on the flexible plate and is electrically connected to the flexible plate. The terminal cap has an insulating portion on a bottom surface. The insulating substrate is arranged between the flexible plate and the terminal cap and has a rupture portion that is broken when the flexible plate flexes beyond an allowable range. The broken ends of the insulating substrate contact the insulating portion of the terminal cap so that the insulating substrate is electrically disconnected from the terminal cap. Additionally, a gasket may be arranged between edges of the flexible plate, the insulating substrate, and the terminal gap plate and an inner wall of the open portion, wherein the gasket insulates the flexible plate, the insulating substrate, and the terminal gap from the can.

In another aspect of the present invention, a rechargeable battery comprises a can having an open portion in an upper region. A power generating unit is arranged in the upper region of the can. A terminal cap is arranged into the opening portion, connected to an electrode of the power generating unit, and has an insulating portion on a bottom surface. A gasket may be installed between an edge of the terminal cap and an inner wall of the opening portion to insulate the terminal cap from the can.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE INVENTION

Figure 3:
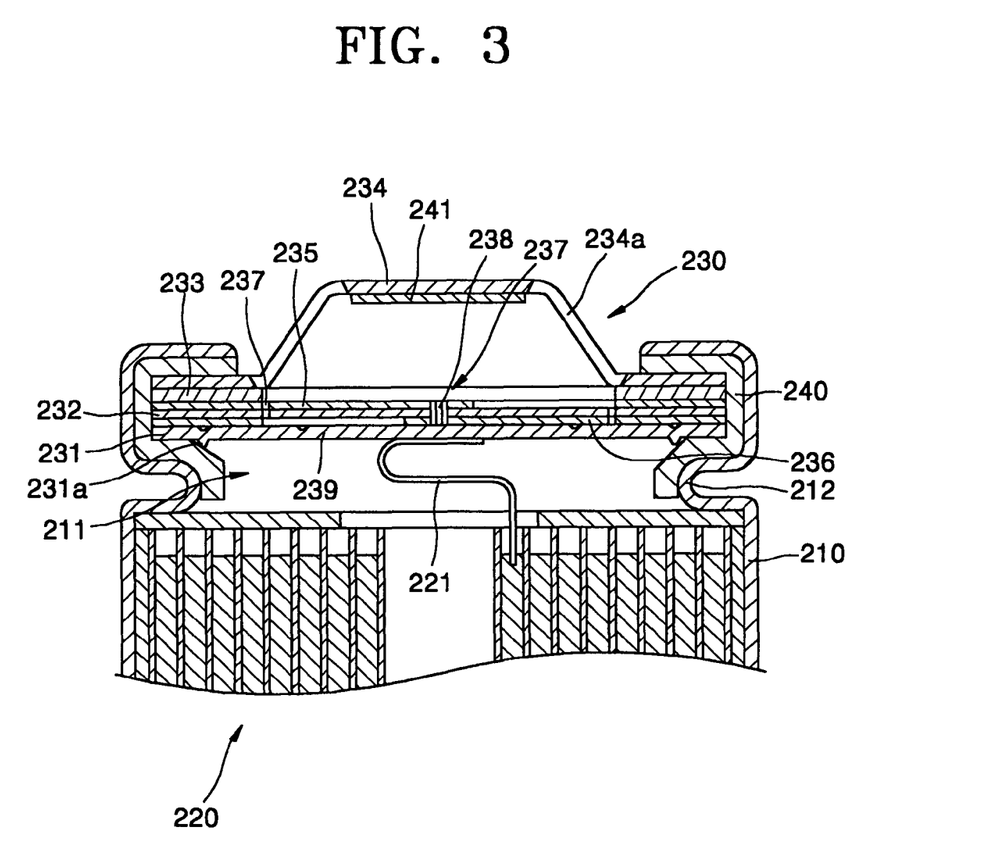
FIG. 3 shows a sectional view of a rechargeable battery according to an embodiment of the present invention.

Reference will now be made in detail to an embodiment of the present invention, an example of which is illustrated in the accompanying drawings. FIG. 3 shows a sectional view of a rechargeable battery according to an embodiment of the present invention.

Figure 4:
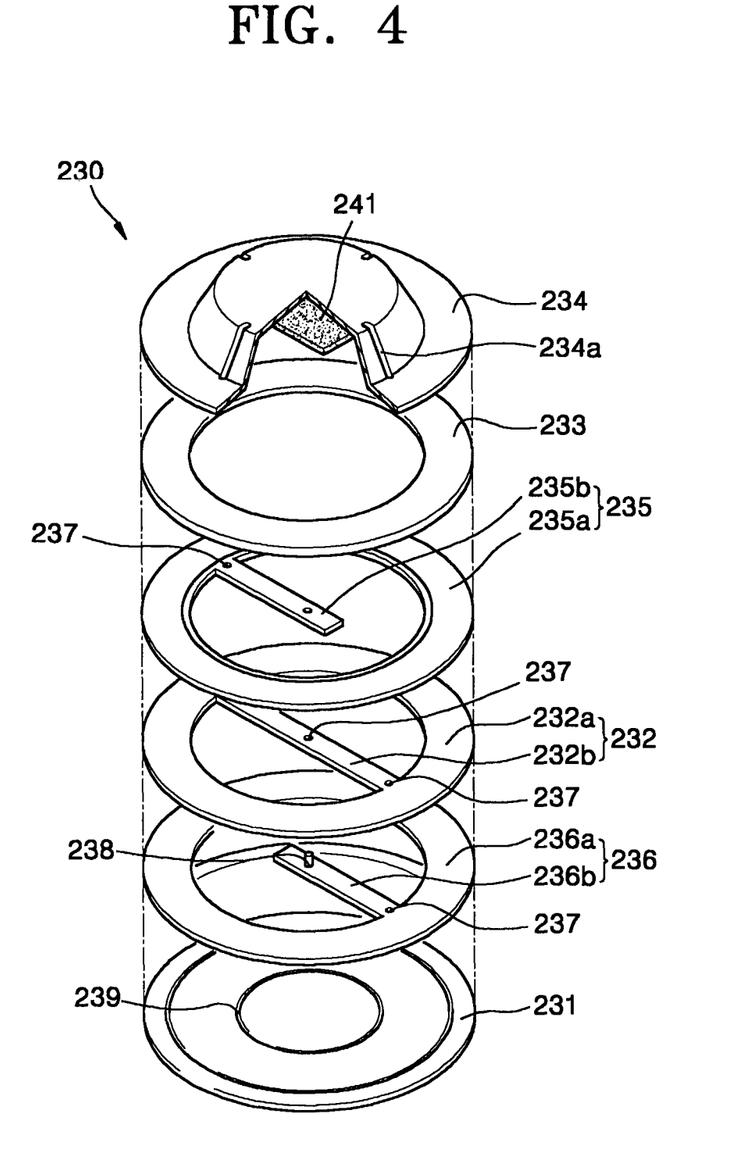
FIG. 4 shows an exploded perspective view of a cap assembly of FIG. 3.

Referring to FIGS. 3 and 4, a rechargeable battery according to an embodiment of the present invention includes a cylindrical can 210 having an opening portion 211 in an upper region, a power generating unit 220 installed in the can 210, and a cap assembly 230 that seals the opening portion 211 of the can 210.

In an embodiment, the power generating unit 220 may comprise an electrode assembly, for example, a rolled stack of a positive electrode plate, a separator, a negative electrode, and an electrolytic solution.

In a lithium rechargeable battery, the positive electrode plate includes a positive electrode current collector made of aluminum thin film. At least one surface of the positive electrode current collector is coated with a positive electrode composition that comprises a cathode active material. The positive electrode composition may be a mixture of a lithium oxide-based positive electrode active material, a binder, a plasticizer, a conducting agent, and the like.

The negative electrode plate includes a negative electrode current collector made of a coiled thin film. At least one surface of the negative electrode current collector is coated with a negative electrode composition. The negative electrode composition may be a mixture of a carbonaceous negative electrode active material, a binder, a plasticizer, a conducting agent, and the like.

The electrode assembly may be formed by rolling the positive electrode plate with separators on both surfaces and the negative electrode plate. The separator between the positive and negative electrode plates insulates the positive and negative electrode plates from one another and allows active material ions to pass into the positive and negative electrode plates. The separator may comprise a polyethylene resin membrane. The electrolytic solution may be a solution of a lithium salt in an organic solvent.

A first electrode tab 221 protrudes from the electrode assembly of the power generating unit 220. The first electrode tab 221 may be a positive electrode tab connected to the positive electrode plate. Alternatively, the first electrode tab 221 may be a negative electrode tab connected to the negative electrode plate.

A second electrode tab (not shown) protrudes from the electrode assembly of the heat generating device 220 toward a bottom portion of the can 210. The second electrode tab is welded to the internal wall of the can 210. The can 210 itself may be manufactured to have the same polarity as the second electrode tab.

The can 210, which is a container of the power generating unit 220, may be made of metal, for example, aluminum and the like. A recessed portion 212 is formed between the power generating unit 220 and the cap assembly 230 to tightly accommodate the electrode assembly of the power generating unit 220 in the can 210.

The cap assembly 230 is fitted into the opening portion 211 of the can 210. The cap assembly 230 includes a flexible plate 231 connected to a first electrode tab 221, an insulating substrate 232 arranged on the flexible plate 231, and a terminal cap 234 arranged on the insulting substrate 232. Additionally, a gasket 240 is arranged between the flexible plate 231, the insulting substrate 232, the terminal cap 234, and an inner wall of the opening portion 211 to insulate the flexible plate 231. That is, the gasket insulates the insulating substrate 232 and the terminal cap 234 from the can 210. The flexible plate 231 and the insulating substrate 232 act as a safety device.

FIG. 4 is an exploded perspective view of the cap assembly 230. Referring to FIG. 4, the flexible plate 231 is a circular plate. The flexible plate 231 flexes toward the terminal cap 234 due to a pressure generated inside the battery. The flexible plate 231 may flex in the direction opposite to the terminal cap 234 when assembled into the can 210. To prevent this, a reinforcing protrusion 231a (see FIG. 3) is formed on a bottom surface of the flexible plate 231.

The insulating substrate 232 installed between the flexible plate 231 and the terminal cap 234 electrically connects the flexible plate 231 and the terminal cap 234 when the battery normally operates. However, the insulating plate 232 breaks when the internal pressure of the battery rises above an allowable range due to an operational failure and the flexible plate 231 deforms, so that the current cutoff device operates.

As shown in FIG. 4, the insulating substrate 232 includes an annular main body portion 232a and upper conductive thin film 235 and lower conductive thin film 236. The first main body portion 232a may be formed of a thermally curable resin. For example, the thermally curable resin may be any combination of phenol resin, urea resin, melamine resin, furan resin, epoxy resin, alkid resin, polyamide, polyurethane, and the like.

The first main body portion 232a has a first bridge 232b formed across a hollow portion of the insulating substrate 232. The first bridge 232b is formed across a flexible center portion of the flexible plate 231. The first bridge 232b has at least one rupture portion 237 that can be broken by pressure.

The rupture portion 237 may include a hole that is easily ruptured. The rupture portion 237 may be formed in the center and both ends of the first bridge 232b. Additionally, at least one hole (not shown) may be formed near the rupture portion 237 such that the rupture portion 237 can be broken easily.

The upper conductive thin film 235 formed on the first main body portion 232a has an annular shape and includes a second main body portion 235a and a second bridge 235b that is formed across a hollow portion of the upper conductive thin film 235. The lower conductive thin film 236 formed underneath the first main body portion 232a has an annular shape and includes a third main body portion 236a and a third bridge 236b across a hollow portion of the lower conductive thin film 236. The second and third bridges 235b and 236b are substantially aligned with the first bridge 232b. As described with regard to the first bridge 232b, a rupture portion 237 may be in each end portion of each of the second and third bridges 235b and 236b.

The upper and lower conductive thin films 235 and 236 may be formed on the insulating substrate 232 by printing. Alternatively, separate conductive thin films may be attached to the surfaces of the insulating substrate 232 as the upper and lower conductive thin films 235 and 236, respectively.

Alternatively, the insulating substrate and the upper and lower conductive thin films may not include first, second, and third main body portions, respectively. For example, separate first, second, and third main body portions and separate first, second, and third bridges may be combined, instead of being manufactured as single integrated bodies. The structures of the insulating substrate 232 and the upper and lower conductive thin films 235 and 236 are not limited to the above. That is, any suitable structure may be used.

For example, a port portion 238 is positioned in the hole of the rupture portion 237 to electrically connect the flexible plate 231 and the terminal cap 234. The rupture portion 237 in the middle of the first bridge 232b of the insulating substrate 232 is utilized. The port portion 238 is formed by inserting a conductive rod into the hole or printing the inner wall of the hole with a conductive material.

The flexible plate 231 and the terminal cap 234 can be electrically connected by the port portion 238 and the upper and lower conductive thin films 235 and 236 because the second and third bridges 235b and 236b of the respective upper and lower conductive thin films 235 and 236 have a hole that is aligned with the port portion 238.

The second bridge 235b of the upper conductive thin film 235 has a length that is shorter than the first bridge 232b and is electrically disconnected from the terminal cap 234 when the rupture portion 237 is broken. The third bridge 236b of the lower conductive thin film 236 is shorter than the first bridge 232b. The upper and lower conductive thin films 235 and 236 are arranged such that the second bridge 235b is connected to the second main body portion 235a at a location that is about 180 degrees around the cap assembly 230 from where the third bridge is connected to the third main body portion 236a, such that the second bridge 235b and third bridge 236b partially overlap. The port portion 238 is arranged in overlapping portions of the second and third bridges 235b and 236b, respectively.

A current limiter 233 may be installed between the terminal cap 234 and the insulating substrate 232. The current limiter 233 controls and cuts off current flow by generating resistance when the temperature of the battery rises above an allowable range. A positive temperature coefficient (PTC) element may be used as the current limiter 233.

An insulating portion 241 is formed on a bottom surface of the terminal cap 234. Accordingly, when the flexible plate 231 flexes upward due to a rise in the internal pressure of the battery and breaks the rupture portion 237, it cuts off the flow of current. More specifically, as the broken ends of the upper conductive thin film 235 and lower conductive thin film 236 contact the insulating portion 241 of the terminal cap 234, the flow of current is completely cut off.

The insulating portion 241 is made of an insulating material, for example, an ultraviolet (UV) curable material. The UV curable material solidifies when UV light radiates onto the material. The insulating portion 241 may be formed by coating, printing, spraying, dipping, and the like. The insulating portion 241 may be formed as an insulating thin film. Alternatively, the insulating portion 241 may be formed by attaching an insulating tape, for example, attaching a polyimide tape to the bottom surface of the terminal cap 234. The insulating portion 241 may be made of a thermally resistant material. The insulating portion 241 is formed wide enough such that the broken ends of the insulating substrate 232 do not directly contact the terminal cap 234.

The cap assembly 230 with the above structure is assembled by sequentially stacking the flexible plate 231, the insulating substrate 232, the current limiter 233, and the terminal cap 234, followed by clamping the stack in the opening portion 211 of the can 210 above the recessed portion 212 while the gasket 240 made of an insulating material is interposed between the edge of the stack and the inner wall of the opening portion 211.

That is, the explosion device discharges internal pressure of the battery from rising even after the insulating substrate 232 is broken to cut off a flow of current. As a secondary safety means, an explosion proof device may be installed to prevent explosion.

Figure 5:
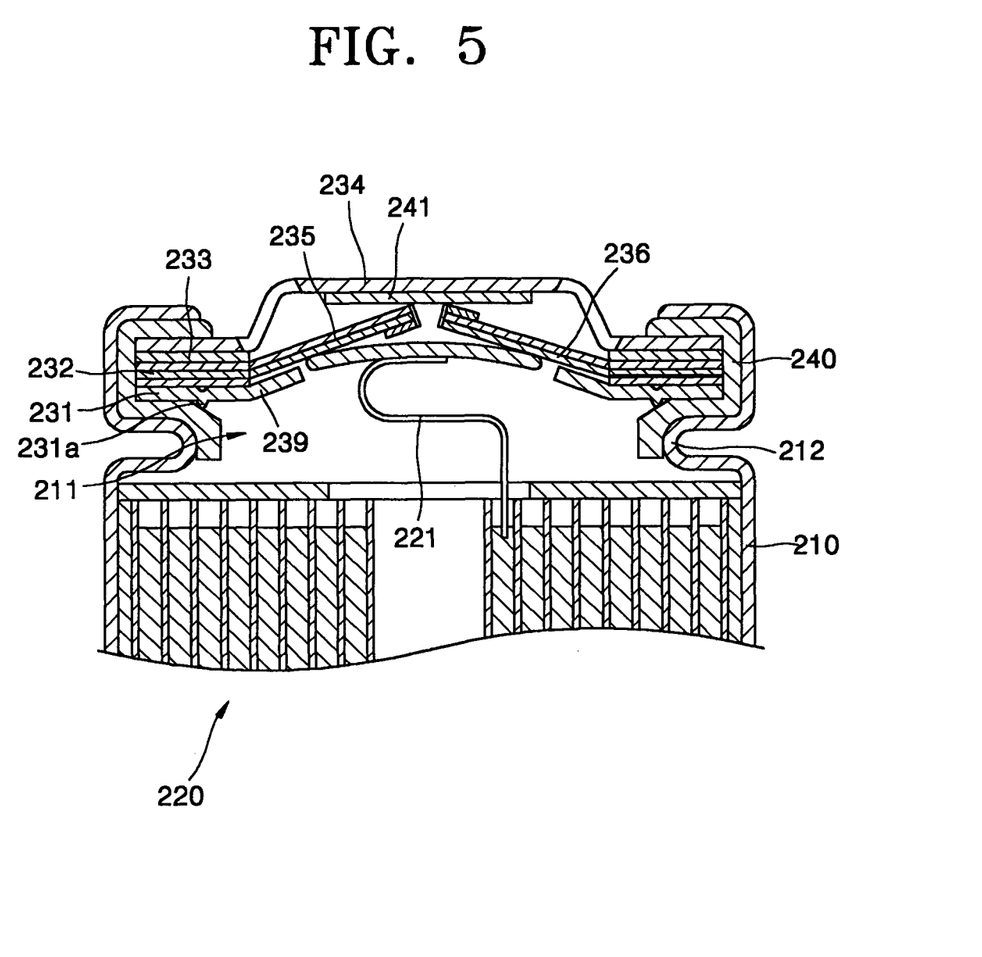
FIG. 5 shows a sectional view illustrating the operation of a current cutoff device in the rechargeable battery of FIG. 3 in connection with a safety vent.

The explosion proof device may include a safety vent 239 formed in the flexible plate 231. Referring to FIG. 5, when the internal pressure of the battery rises, the flexible plate 231 breaks along the safety vent 239, resulting in a gap through which internal gas and the electrolytic solution can be discharged. The safety vent 239 may be formed using a mechanical method, etching, electroforming, and the like.

The rechargeable battery having the above structure according to the present invention operates as follows.

When the internal pressure of the battery rises due to abnormal conditions, for example, improper use of the battery, short-circuit and the like, the flexible plate 231 of the current cutoff device flexes toward the terminal cap 234 and the rupture portion 237 of the insulating substrate 232 ruptures due to the deformation force, thereby cutting off the flow of current in the battery.

When the insulating substrate 232 breaks, the broken ends of the insulating substrate 232, i.e., the printed portion of the insulating substrate 232 and the broken ends of the upper and lower conductive thin films 235 and 236, contact the insulating portion 241 formed on the bottom surface of the terminal cap 234, thereby completely cutting off the flow of current in the battery. As such, the current cutoff device can operate with improved reliability, thus ensuring the safety of the battery.

When the internal pressure of the battery continues to rise even after the flow of current is cut off, the safety vent 239 of the flexible plate 231 breaks and forms a gap in the flexible plate 231, so that internal gas and the electrolytic solution are discharged through the gap and a ventilation hole 234a (see FIG. 4) formed in the terminal cap 234. This prevents explosion of the battery.

As described above, in a rechargeable battery according to the present invention, a flow of current can be timely cut off when the internal pressure of the battery rises due to abnormal conditions, such as improper use of the battery, short circuit, and the like. In addition, the rechargeable battery allows internal gas and the electrolytic solution to discharge when there is a risk of explosion and ensures safety. Due to the insulating portion formed on the bottom surface of the terminal cap, the broken ends of the insulating substrate neither contact nor are electrically connected to the terminal cap. As such, the operational reliability of the current cutoff device increases.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A rechargeable battery, comprising:
   a container;
   a power generating unit arranged in a portion of the container;
   a terminal cap arranged on the container and over the power generating unit, wherein the terminal cap includes an insulating portion to substantially prevent short circuits; and
   a safety device arranged between the power generating unit and the terminal cap,
   wherein the safety device comprises an insulating substrate comprising a rupture portion that is configured to break when the safety device flexes,
   wherein the insulating portion is spaced apart from the insulating substrate when the rupture portion is unbroken,
   wherein the insulating portion is arranged directly on a bottom surface of the terminal cap and disposed entirely inside of the terminal cap, and
   wherein the insulating portion does not contact the insulating substrate.

2. The rechargeable battery of claim 1, wherein the insulating portion comprises one of an insulating film and an insulating tape.

3. The rechargeable battery of claim 2, wherein the safety device further comprises a flexible plate arranged in the container, connected to an electrode of the power generating unit.

4. The rechargeable battery of claim 3, wherein the terminal cap is arranged on the flexible plate and electrically connected to the flexible plate.

5. The rechargeable battery of claim 4, further comprising:
   a gasket arranged between edges of the flexible plate and the insulating substrate and an inner wall of the container to insulate the flexible plate and the insulating substrate from the container.

6. The rechargeable battery of claim 5, further comprising an upper conductive film and a lower conductive film formed on opposite surfaces of the insulating substrate, wherein the upper conductive thin film and lower conductive thin film are electrically connected with each other by a portion inserted through the insulating substrate.

7. The rechargeable battery of claim 3, wherein the flexible plate comprises a safety vent to allow an excess internal pressure to be discharged.

8. The rechargeable battery of claim 5, further comprising a current limiter arranged between the insulating substrate and the terminal cap to control and substantially block the flow of current in the rechargeable battery in response to an internal temperature of the rechargeable battery.

9. The rechargeable battery of claim 5, wherein the rupture portion comprises a hole formed in a bridge, the bridge being formed across a portion of the insulating substrate.

10. The rechargeable battery of claim 2, wherein the insulating portion comprises a thermally resistant material.

11. The rechargeable battery of claim 10, wherein the insulating portion comprises polyimide tape.

12. A rechargeable battery, comprising:
    a can having an open portion in an upper region;
    a power generating unit arranged in the upper region of the can;
    a terminal cap arranged in the opening portion, connected to an electrode of the power generating unit and having an insulating portion;
    a gasket installed between an edge of the terminal cap and an inner wall of the opening portion; and
    a safety device arranged between the terminal cap and the electrode of the power generating unit,
    wherein the safety device comprises an insulating substrate comprising a rupture portion that is configured to break when the safety device flexes,
    wherein the insulating portion is spaced apart from the insulating substrate when the rupture portion is unbroken,
    wherein the insulating portion is arranged directly on a bottom surface of the terminal cap and disposed entirely inside of the terminal cap, and
    wherein the insulating portion does not contact the insulating substrate.

13. The rechargeable battery of claim 12, wherein the insulating portion comprises at least one of an insulating thin film and an insulating tape.

14. The rechargeable battery of claim 13, wherein the insulating portion comprises a thermally resistant material.

15. The rechargeable battery of claim 12, wherein the broken rupture portion contacts the insulating portion.

16. The rechargeable battery of claim 12, wherein the safety device further comprises a flexible plate arranged on the power generating unit and electrically connected to a surface of the terminal cap.

17. The rechargeable battery of claim 16, wherein the insulating substrate is arranged between the flexible plate and the terminal cap.

18. The rechargeable battery of claim 16, wherein the safety device further comprises a current limiter that controls and substantially blocks a flow of current in response to an internal temperature of the rechargeable battery.

19. The rechargeable battery of claim 13, wherein the insulating portion comprises the insulating tape, and the insulating tape comprises polyimide tape.

\* \* \* \* \*